Feb. 27, 1951   R. J. RIVERS   2,543,380
EDUCATIONAL BALL RUNWAY TOY
Filed March 4, 1947   2 Sheets-Sheet 1
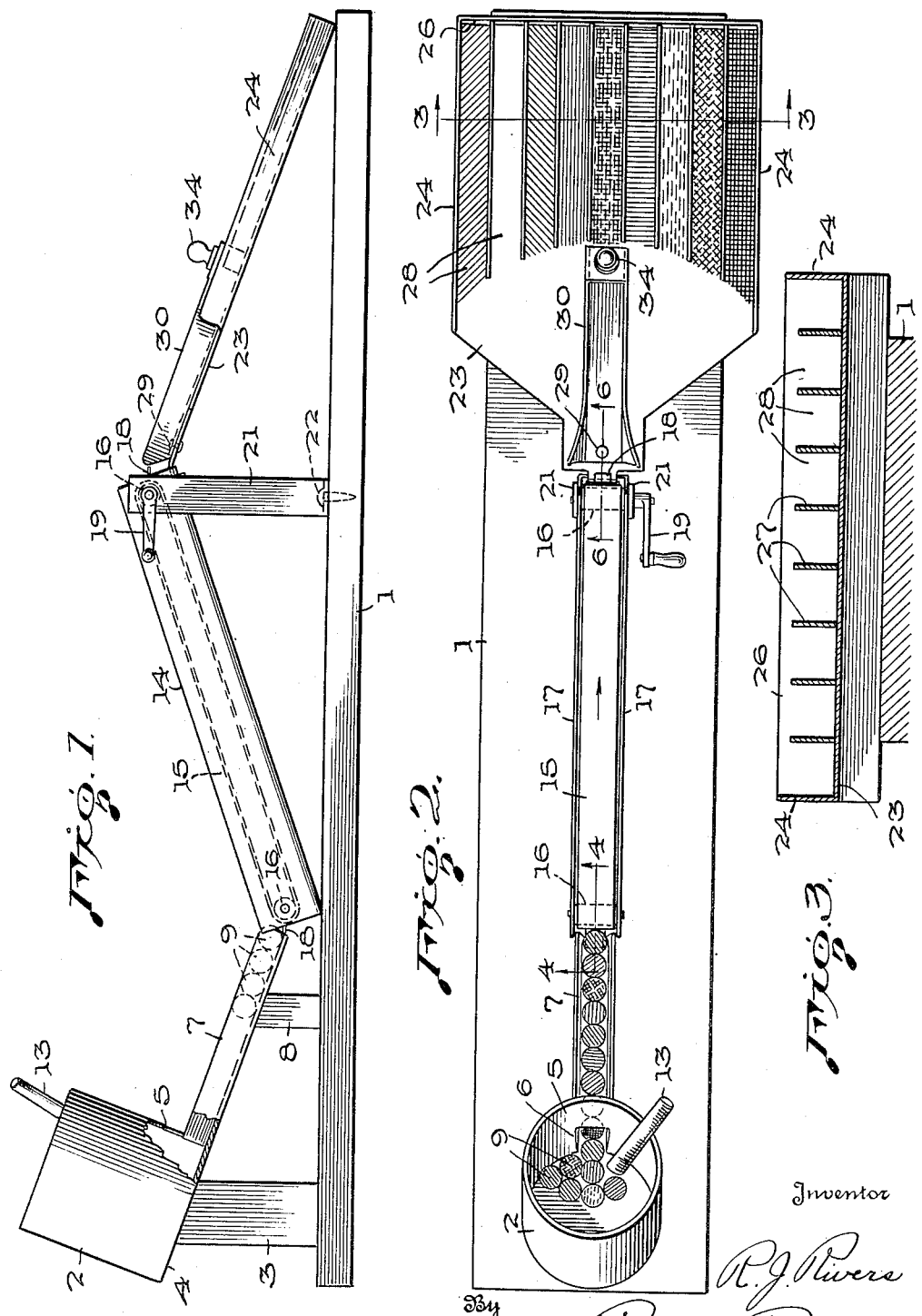

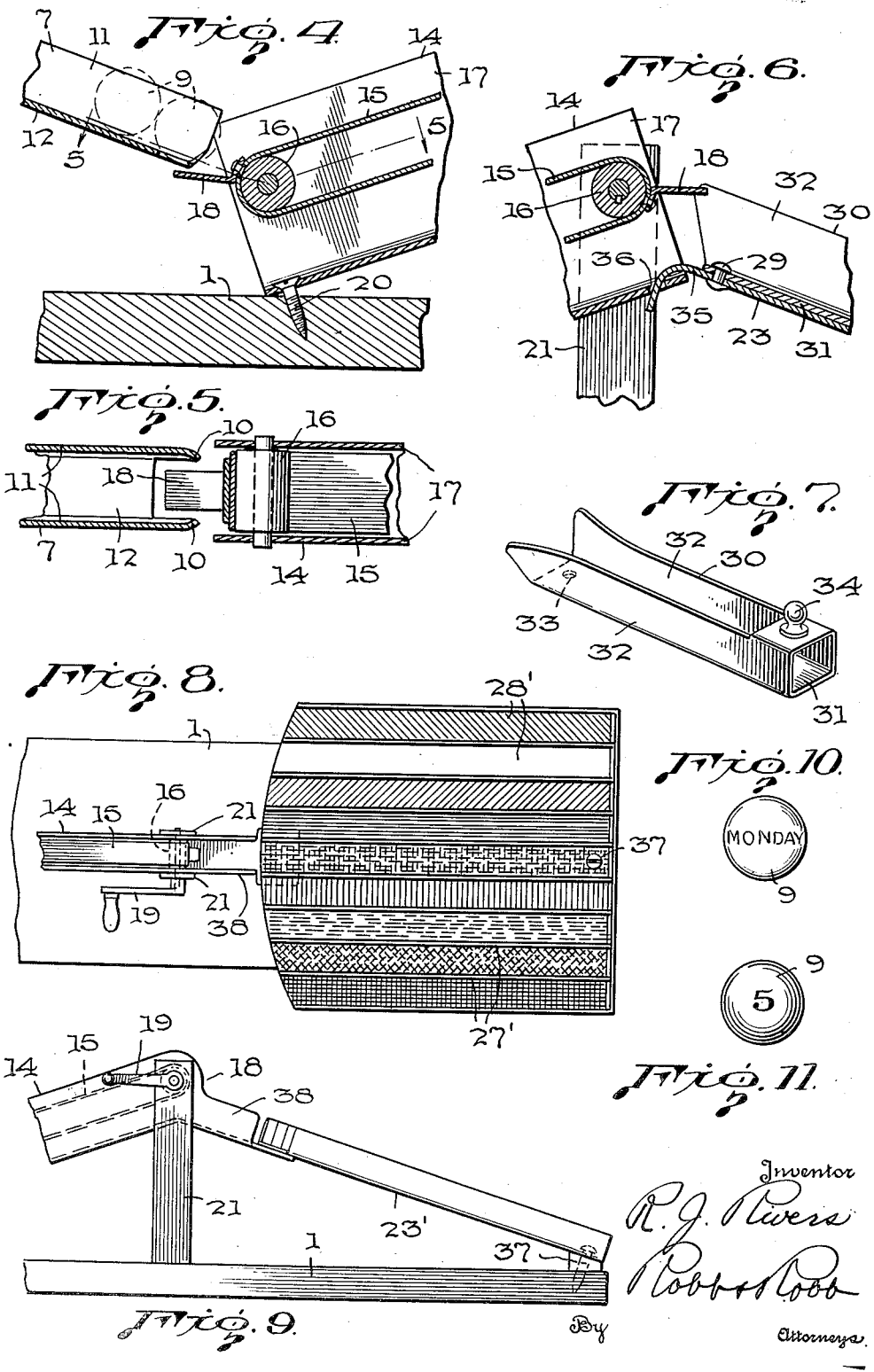

Patented Feb. 27, 1951

2,543,380

UNITED STATES PATENT OFFICE 2,543,380

EDUCATIONAL BALL RUNWAY TOY

Ralph J. Rivers, Syracuse, N. Y.

Application March 4, 1947, Serial No. 732,317

7 Claims. (Cl. 46—43)

The present invention relates to an educational toy, and more especially to an educational aid for teaching the colors, numbers, letters, words and other indicia, symbols, and the like, by selectively matching such colors, numbers, letters, etc., as the case may be.

While my invention has been primarily developed for use by children ranging in age from about 3 to 7 years, it is to be understood that it is not confined to such use since it is equally adaptable for use in occupational therapy classes, hospitals, and mental institutions, as well as in the home, schools, and in the offices of physicians and eye specialists who minister to or prescribe for children.

It is a well recognized fact that there are few substantial toys which are suitable for children in the age bracket above referred to, and those that are available are either of the "dead" type, such as trucks, cars, animals, and the like, which are merely pushed or pulled around, or they are of a more elaborate or complicated type, that are "too old" for the full appreciation of a young child.

Accordingly, it is a primary object of the present invention to provide a new and improved toy which is relatively simple, sturdy, safe and inexpensive, and which especially appeals to children as both an amusement device which never becomes monotonous, as well as an educational device for teaching mental and physical coordination.

A further object of the invention is to provide an educational toy which comprises a receptacle containing a plurality of balls or other rolling pieces which are to be successively directed onto an inclined conveyor, preferably of the manually operable, endless belt type, and a receiver having a plurality of pockets or channels into which the rolling pieces may be selectively directed on discharge of the same from the conveyor, said rolling pieces being differently colored, numbered, lettered, or otherwise bearing different words, pictures or other indicia to be matched with corresponding colors, numbers, letters, words, pictures or other indicia identifying the respective pockets or channels.

Other and further objects and advantages of the invention will be hereinafter described and the novel features thereof defined in the appended claims.

In the drawings:

Figure 1 is a view in side elevation of an educational toy constructed in accordance with my invention;

Figure 2 is a top plan view of the toy;

Figure 3 is a transverse sectional view, on a somewhat enlarged scale, taken on the line 3—3 of Figure 2, through the ball receiving pockets or channels;

Figure 4 is a fragmentary longitudinal sectional view, on an enlarged scale, taken on the line 4—4 of Figure 2, through the lower end of the fixed ball chute and the adjacent ball receiving end of the conveyor;

Figure 5 is a fragmentary sectional view taken on the line 5—5 of Figure 4;

Figure 6 is a fragmentary sectional view, on an enlarged scale, taken on the line 6—6 of Figure 2, through the ball discharging end of the conveyor and the adjacent end of the pivotal ball chute and its supporting plate;

Figure 7 is an enlarged perspective view of the pivotal ball chute;

Figure 8 is a fragmentary top plan view of a modified form of the toy;

Figure 9 is a fragmentary view in side elevation of the modified arrangement shown in Figure 8;

Figure 10 is a plan view of a modified form of ball or rolling piece as employed for matching words such as the days of the week; and Figure 11 is a plan view of a further modified form of ball or rolling piece as employed for matching numbers.

Like reference characters designate corresponding parts in the several figures of the drawings, wherein 1 denotes a base made of wood or any other suitable material, and having mounted thereon at one end thereof a cup or receptacle 2 which is supported in an elevated position above the base by means of a standard or supporting block 3. The receptacle 2 is so mounted that its bottom wall 4 is downwardly inclined towards the base 1, and in the forward wall 5 of the receptacle 2 is an opening 6 located just above the bottom wall 4.

Attached to the receptacle 2 and extending forwardly therefrom in alignment with the opening 6 is a fixed ball chute 7 which is forwardly and downwardly inclined, said chute 7 being suitably supported on the base 1 at the forward end of the chute, as by means of a standard or supporting block 8. The receptacle 2 is adapted to contain a plurality of balls, or other rolling pieces designated 9 which are of such size as to be capable of freely passing through the opening 6 and to roll by gravity down the chute 7 to the forward lower end of the same, said chute 7 being constricted at its extreme forward end, as indicated at 10, 10 in Figure 5, with the constriction formed in the lower portions of the opposite side walls 11, 11, near the bottom wall 12 of the chute 7, so that as each ball 9 reaches the extreme forward end of the chute 7, it will be temporarily restrained against further rolling movement.

The balls 9 may be of different colors and/or they may have depicted thereon letters, words, numbers, pictures, symbols or other indicia to identify the same and to distinguish the balls from each other. When the balls are placed in the receptacle 2, they should be stirred up or mixed so as to successively pass through the opening 6, at random, and down the chute 7. A stirrer or paddle 13 is preferably provided to facilitate the mixing of the balls in the receptacle 2, and to free any jams that may occur at the discharge opening 6. The stirrer 13 may also be employed to obstruct or block the opening 6, when desired, to prevent any further discharge of the balls 9 through the opening 6.

Mounted on the base 1 in alignment with the fixed ball chute 7 is a conveyor generally designated 14, said conveyor preferably being of the endless belt type, with the endless belt 15 passing about rollers 16, 16 adjacent to the respective opposite ends of the conveyor, said rollers being rotatably supported between laterally spaced side walls 17, 17 of the conveyor. Attached to the upper face of the endless belt 15, and extending outwardly therefrom, is one or more fingers 18, said fingers being adapted to engage the ball 9 at the extreme forward end of the chute 7 and lift it out of the chute onto the belt 15 so that the ball will be carried forwardly by the upper reach of the belt as the belt is moved by means of a manually operated crank 19 which is suitably fixed to the forward roller 16 for imparting rotation thereto.

As will be seen from reference to Figure 1 of the drawings, the conveyor 14 is disposed in an upwardly inclined position, being attached at its lower end in any suitable manner, as by means of a screw 20, to the base 1, with the end of the conveyor disposed adjacent to the fixed chute 7 so that the balls 9 may be transferred from the chute to the conveyor belt 15. The forward end of the conveyor is supported in an elevated position in any suitable manner, as by means of the standards 21, 21 extending upwardly from the base 1 and suitably anchored thereto, as by means of screws 22.

At the forward end of the conveyor 14, there is disposed a downwardly inclined plate generally designated 23, said plate having upwardly extended flanges 24, 24 at the opposite sides thereof, and an upwardly extended end flange or wall 26. The upper surface of the plate 23, between the side walls 24, 24, is preferably divided by a series of upwardly extended partitions 27 into a plurality of pockets or ball-receiving channels 28 which are of such width as to accommodate the balls 9, and preferably of such length as to be capable of receiving a plurality of balls in each pocket. The pockets or channels 28 are of different colors corresponding to the colors of the various balls 9, and/or the pockets may be numbered, lettered, or otherwise marked with words, pictures, symbols, or other indicia, conforming to the markings or indicia on the various balls 9.

Pivotally attached to the upper face of the plate 23 and secured thereto by a rivet, pin, or other pivotal anchorage 29, is a pivotal ball chute 30, said chute 30 having a bottom wall 31 which is provided with laterally spaced, upwardly extended side walls 32, 32. At its rear end, the bottom wall 31 is provided with an aperture 33 to receive the anchorage 29 on which the chute 30 pivots, and the rear ends of the side walls 32, 32 of the chute terminate adjacent to the forward end of the conveyor 14, and preferably diverge laterally so as to insure discharge of the balls 9 from the conveyor into the pivotal chute 30. At its forward end, the chute 30 is preferably provided with a knob 34 or other finger piece to facilitate swinging of the chute 30 about the axis of the anchorage 29, and the rear ends of the partitions 27 are terminated on an arc which will permit the chute 30 to be freely swung laterally in either direction, while enabling the chute 30 to be selectively registered or aligned with the entrances to the respective pockets or channels 28.

For the purpose of supporting the plate 23 in its downwardly inclined position as shown in Figure 1 of the drawings, the forward end of the plate may be rested upon the base 1, and its rear end is preferably provided with a hook 35 for displaceable engagement in an aperture 36 provided in the forward end of the conveyor 14. It is to be understood, however, that the plate 23 may be supported or otherwise detachably connected to the conveyor 14 in any desired manner.

Now in the use of the toy, and assuming that the balls 9 which are placed in the receptacle 2 have different colors, and the pockets or channels 28 are differently colored to correspond with the various colors of the balls, the balls will automatically feed through the discharge opening 6 in the receptacle, and roll down the fixed chute 7, one after another. The objective is to get the balls into the pockets or channels 28 of the colors which match the respective balls. Accordingly, the child must first select the particular channel or pocket 28 into which the ball at the extreme forward end of the fixed chute 7 is to be directed. When the selection or decision has been made, the child swings the chute 30 to register it with this particular pocket or channel, and thereupon by operating the crank 19, the endless belt 15 will be set into operation until the projecting finger 18 engages beneath the ball 9 at the extreme forward end of the fixed chute 7. As the operation of the belt continues, the finger 18 will lift the ball upwardly and forwardly, clearing the constriction at the forward end of the fixed chute 7, until the ball is transferred onto the belt 15 ahead of the finger 18. The ball is then carried forwardly and upwardly by the belt 15 until it reaches the extreme forward end of the conveyor 14, where it is discharged into the pivotal chute 30 which directs it into the proper pocket or channel 28, as the ball rolls down the chute 30 and into the channel.

By providing a conveyor 14 of the endless belt type which has to be manually operated, the child or other operator is required to exercise both the mental and physical faculties, and ample time is allowed during the travel of the balls from the fixed chute 7 to the pivotal chute 30 to mentally coordinate or match the colors of the balls with the corresponding colors of the respective pockets or channels 28, and at the same time to physically coordinate and exercise the hands and the eyes.

Instead of matching colors, the balls may be suitably marked with letters or groups of letters forming words, such as the days of the week, as illustrated particularly in Figure 10 of the drawings, days of the month, numbers such as is shown in Figure 11 of the drawings, pictures, symbols or other indicia, and in each case, the pockets or channels 28 will be correspondingly marked to match the various differentiating markings on the balls. In all of these cases, the operation of the toy is the same, and is based upon the same principle.

In Figures 8 and 9 of the drawings, I have shown a modified form of the toy, differing from the construction illustrated in Figures 1 to 7 inclusive, primarily in the omission of the pivoted chute 30 previously described, and substituting in lieu thereof a plate 23' which is generally similar to the plate 23, with its upper surface divided into a plurality of channels or pockets 28' by means of partitions 27', and the plate 23' being attached to the base 1 so as to be shiftable laterally to either side of the longitudinal center of the toy, as by pivoting the forward end of the plate 23' about a pin or screw 37. Thus, the plate 23' is free to shift laterally in either direction by bodily movement thereof to selectively align or register the respective pockets or channels 28' with a short fixed chute 38 extending forwardly from the forward end of the conveyor unit 14, said conveyor unit and the other parts of the toy being otherwise the same as in the form first described. The pockets or channels 28' are colored, numbered, lettered, or otherwise identified in the same manner as previously described, so as to correspond with the various identifications of the respective balls 9 which are to be matched therewith.

It will be understood from the foregoing that my educational toy is in no sense a game of chance, but rather serves as a positive means for matching objects or other characteristics availed of to teach colors, letters, numbers, words, etc. The toy also serves as a useful aid in determining color blindness and other pathological and/or organic conditions or defects of the eye. Heretofore, when small children have their eyes examined, they are so nervous, excited, or frightened that they cannot truthfully or accurately respond to the usual tests. By employing my toy, the child can be reassured, and all nervousness, excitement and fright eliminated, and the tests can be conducted, particularly for color blindness, with the aid of the toy.

While the specific details have been herein shown and described, the invention is not confined thereto as changes and alterations may be made without departing from the spirit thereof as defined by the appended claims.

I claim:

1. In an educational toy of the class described, a plurality of balls having various identification characteristics, a receptacle adapted to contain said balls, said receptacle having a ball discharge opening for gravity discharge of the balls therefrom in succession, one at a time, a plurality of ball receiving pockets disposed in spaced relation to the receptacle aforesaid, and having various identification characteristics corresponding to those of the balls, and means including a movable endless belt on which the balls are successively received and carried from the receptacle for successively conveying the balls from the receptacle to the pockets, and a pivotal chute disposed at the discharge end of the conveying means, said chute being selectively shiftable into registry with the respective pockets for selectively directing the balls into the pockets corresponding in identification with the respective balls.

2. In an educational toy of the class described, a plurality of balls having various identification characteristics, a receptacle adapted to contain said balls, said receptacle having a ball discharge opening for gravity discharge of the balls therefrom in succession, one at a time, a downwardly inclined fixed chute leading forwardly from the discharge opening of the receptacle, an upwardly inclined conveyor leading forwardly from the fixed chute for successively conveying the balls forwardly and upwardly therefrom, and a downwardly inclined plate leading forwardly from the conveyor and having a plurality of ball receiving pockets disposed at the forward end thereof in side-by-side relation to each other, and said pockets having various identification characteristics corresponding to those of the respective balls, and a chute shiftably mounted on the plate and leading forwardly from the conveyor to the pockets, said chute being shiftable into registry with the respective pockets to permit the balls to be directed from the conveyor into a pocket of corresponding identification.

3. In an educational toy of the class described, a plurality of balls having various identification characteristics, a receptacle adapted to contain said balls, said receptacle having a ball discharge opening for gravity discharge of the balls therefrom in succession, one at a time, a downwardly inclined fixed chute leading forwardly from the discharge opening of the receptacle, an upwardly inclined conveyor leading forwardly from the fixed chute for successively conveying the balls forwardly and upwardly therefrom and a downwardly inclined plate leading forwardly from the conveyor and having a plurality of ball receiving pockets disposed at the forward end thereof in side-by-side relation to each other, and said pockets having various identification characteristics corresponding to those of the respective balls, and a chute pivotally mounted on the plate and leading forwardly from the conveyor to the pockets, said chute being shiftable laterally into registry with the respective pockets to permit the balls to be directed from the conveyor into a pocket of corresponding identification.

4. In an educational toy of the class described, a plurality of balls having various identification characteristics, a receptacle adapted to contain said balls, said receptacle having a ball discharge opening for gravity discharge of the balls therefrom in succession, one at a time, a receiver having a plurality of ball-receiving pockets disposed in spaced relation to the receptacle aforesaid, and having various identification characteristics corresponding to those of the balls, conveyor means including a movable endless belt on which the balls are successively received and carried from the receptacle for successively conveying the balls from the receptacle to the pockets, and a chute disposed at the discharge end of the conveyor means for selectively directing the balls into the pockets corresponding in identification with the respective balls, said chute and the receiver being shiftable relative to each other for selective registry of said chute with one of the pockets to permit the balls to be directed from the conveyor into a pocket of corresponding identification.

5. An educational toy as defined in claim 4, wherein said receiver is shiftable for selective registry of the pockets with the chute at the discharge end of the conveyor.

6. An educational toy as defined in claim 4, wherein the identification characteristics of the balls and the pockets comprise various colors.

7. An educational toy as defined in claim 4, wherein the identification characteristics of the balls and the pockets comprise various indicia.

RALPH J. RIVERS.

REFERENCES CITED

The following references are of record in the file of this patent:

UNITED STATES PATENTS

| Number | Name | Date |
|---|---|---|
| 1,166,537 | Neal | Jan. 4, 1916 |
| 1,278,203 | Pierce | Sept. 10, 1918 |
| 1,531,455 | Russell | Mar. 31, 1925 |
| 1,562,929 | Trovaton | Nov. 24, 1925 |
| 1,663,257 | MacKenzie | Mar. 20, 1928 |
| 1,877,643 | Brown | Sept. 13, 1932 |
| 1,920,701 | Jenkins | Aug. 1, 1933 |
| 2,033,645 | Parkhill | Mar. 10, 1936 |
| 2,236,536 | Hilton | Apr. 1, 1941 |